Oct. 11, 1932.   C. A. FINE   1,881,429
LUBRICATING APPARATUS
Filed Nov. 11, 1927
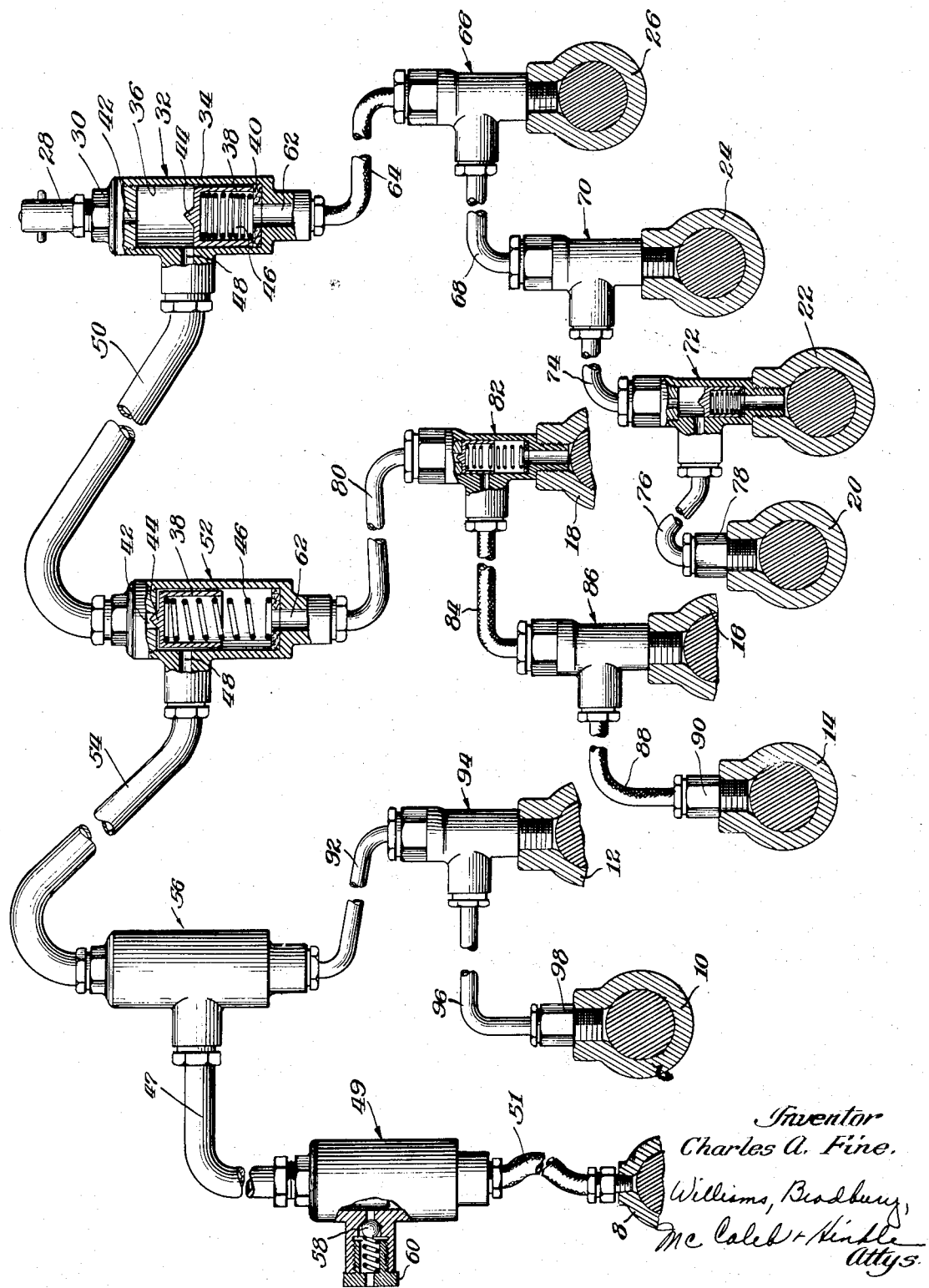
Inventor
Charles A. Fine.
Williams, Bradbury,
McCaleb & Hindle
Attys.

Patented Oct. 11, 1932

1,881,429

UNITED STATES PATENT OFFICE

CHARLES A. FINE, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed November 11, 1927. Serial No. 232,561.

My invention relates to lubricating apparatus of the series or progressive type, that is, systems in which measuring valves applied to the bearings are operated successively to force measured charges of lubricant thereto.

It is an object of my invention to provide an improved system of this general type which may be applied to machines of various kinds, for the lubrication of a plurality of bearings having relative movement.

A further object is to provide an improved central system of lubricating wherein a plurality of bearings are lubricated with the conduits arranged in multiple series.

A further object is to provide a system of lubrication which is accurate, efficient and which is easily operable effectively and quickly to lubricate a plurality of machine bearings.

Other objects will appear from the following description, reference being had to the accompanying drawing which is a conventional illustration of the system of my invention, parts thereof being shown in vertical section.

The present invention is a modification of the lubricating system shown and described in the co-pending application of Ernest W. Davis, Serial No. 219,837, filed September 16, 1927, and is particularly adapted for installation on machines having a plurality of bearings, groups of which move relatively to other bearings of the machine.

In the drawing I have shown a number of bearings, 8, 10, 12, 14, 16, 18, 20, 22, 24 and 26 in which, it will be assumed, that bearings 8, 14 and 16 move relative to bearings 18 and relative to each other and bearings 20, 22, 24 and 26 normally move with respect to bearing 18 and also with respect to bearings 10 and 12. All of the bearings may be part of one machine or they may be parts of different machines. Lubricant is supplied to the system in the usual manner by applying a coupling of a high pressure lubricant compressor to a pin fitting 28 which is threaded in a cap 30 of a primary lubricant measuring device 32, the latter consisting of a body 34 having an axial bore 36 therein forming a cylinder for a piston valve 38 which is of slightly lesser diameter than that of the cylinder 36 so as to provide a by-pass for lubricant. A gasket 40 is positioned at the lower end of the cylinder 36 and provides a seat for the lower edge of the skirt portion of the valve 38 when the latter is in its lowermost position, as shown in the device 32. The cap 30 has an inlet duct 42 which is adapted to be closed by a conical projection 44 formed at the center of the top of the valve 38. The valve is normally pressed upwardly, with this projection 44 sealing the inlet duct 42, by a spring 46 confined below the head of the valve 38 and resting upon the gasket 40. An outlet duct 48 is located so as to be uncovered by the valve 38 as the latter approaches its lowermost position. This outlet duct is connected by a conduit 50 to a second primary measuring device 52 which is similar in every respect to the device 32 just described.

In the illustration of the device 52 its valve 38 is shown in its normal uppermost position in which the inlet duct 42 is closed by the projection 44. The outlet duct 48 of the device 52 is connected by a conduit 54 with a third primary measuring device 56 which may be of the same internal construction as the devices 32 and 52, but may be of a different size.

The outlet passage 48 of the device 56 is connected by a rigid conduit 47 to the inlet of a measuring device 49, the measured charge outlet of which is connected by a flexible conduit 51 to the bearing 8. The device 49 may be attached to a stationary part of the machine while the bearing 8 is relatively movable. By using this method of connection the flexible conduit need not withstand the high lubricant pressures which are necessarily present in the other conduits. The conduit 51 need only be sufficiently strong to withstand the back pressure resulting from the resistance to flow in the bearing. In some instances where the bearing 8 is a sliding bearing or other bearing which offers substantially no resistance to the admission of lubricant, the conduit 51 may be relatively small and light in weight.

The outlet passage 48 of the device 49 is normally closed by an outwardly opening spring pressed ball check valve 58 which is retained in position by a bushing 60 threaded into the body of the device and having a lubricant passage therethrough.

The devices 32, 52, and 56 comprise the primary measuring instrumentalities and serve as means for charging branch conduits with measured quantities of lubricant as will hereinafter appear.

The device 32 has an outlet passage 62 which is connected by a flexible conduit 64 with a measuring device 66 which is similar to the device 32 but is of one-fourth the volumetric size. The outlet passage of the device 66 is connected by a conduit 68 to a measuring device 70 attached to the bearing 24, the capacity of the device 70 also being approximately one-fourth the capacity of the device 32. The device 70 is, in turn, connected to a measuring device 72 (similar to device 70) attached to bearing 22 by a conduit 74. The outlet of the device 72 is connected by a conduit 76 to a suitable nipple 78 threaded into the bearing 20.

The capacity of each of the secondary measuring devices 66, 70, and 72 may be varied to accord with the requirements of the bearing with which it is associated, but the primary device 32 must have a capacity greater than the sum of the capacities of the secondary devices supplied with lubricant thereby, so as to allow for the lubricant which is to be supplied the last bearing 78.

Assuming that the primary device 32 is fixed to a readily accessible stationary part of the machine to be lubricated, the bearings 20, 22, 24 and 26 may move relative thereto due to the interposition of the flexible conduit 64. The term "flexible conduit" is to be understood to include all such substitutes for a flexible hose, such as articulated pipe, including sections of rigid pipes joined by universal, swivel, and multiple swivel connections such as are well known in the art of lubrication.

The primary measuring device 52 is connected through conduit 80 to a secondary measuring device 82 attached to bearing 18, the outlet of the latter being connected by a flexible conduit 84 with a second smaller device 86 at bearing 16, the outlet of the device 86 being connected by a flexible conduit 88 to a suitable nipple 90 attached to bearing 14. Bearings 14 and 16 may thus move relative to bearing 18, and also relative to each other.

In a similar manner the outlet of the device 56 is connected by a conduit 92 to a device 94 attached to bearing 12 and the outlet of the latter device is in turn connected by a conduit 96 to a nipple 98 associated with bearing 10.

Assuming that each of the devices 32, 52 and 56 has a capacity of four units of lubricant and that the devices 66, 70, 72, 82, 86 and 94 each have a capacity of one unit, bearing 10 will receive three units of the lubricant, bearing 12, one unit, bearing 14, two units, and bearings 8, 16, 18, 20, 22, 24 and 26, one unit each, thus making it possible to proportion the supply of lubricant to each of the bearings in accordance with its needs without making necessary the use of any but standard units. The device 49 may have any desired capacity since it supplies only the one bearing 8.

When lubricating the operator connects a lubricant compressor to the fitting 28 and forces the lubricant under high pressure into the cylinder 36, causing the piston valve 38 to move downwardly and seal against its seat 40. Assuming that the system including all the conduits is completely filled with lubricant, a downward movement of the valve 38 will force, let us say, four units of lubricant through the flexible conduit 64 to the device 66. The latter device will operate to supply one unit of the lubricant to its bearing 26 and permit three units to pass on to the next device 70 which will, in turn, supply one unit of lubricant to its bearing 24 and permit two units thereof to pass to the device 72. The latter, after ejecting one unit of lubricant to its bearing 22, will permit the passage of the remaining unit to the bearing 20. It is unnecessary to use a measuring device with the bearing 20, since the quantity of lubricant supplied to this bearing is determined by the difference between the total capacity of the devices 66, 70 and 72 and the capacity of the device 32.

The valve 38 will be retained upon its gasket 40 at the lower end of its stroke because the pressure required to unseat the measuring valve 38 of the device 52 is materially greater than that required to maintain the spring 46 of the device 32 compressed. This is due to the fact that the pressure cannot be exerted upon the piston valve 38 of the device 52 except at its conical projection 44 which is of such small cross-sectional area that an extremely high pressure is required to overcome the force of its spring 46.

Upon operation of the device 52, the devices 82 and 86 will, of course, be successively operated to force lubricant to their associated bearings. Each of the bearings 18 and 16 will, under the conditions assumed, receive one unit of lubricant and the remaining two units of the charge supplied by the device 52 will be forced into the bearing 14. Upon completion of the operation of the device 52, the passage 48 will be uncovered and lubricant will pass therethrough to the device 56 which will operate in a similar manner to force lubricant to the device 94, attached to bearing 12, and to the bearing 10, which, under the conditions assumed, will receive three units of lubricant. After the device 56 has operated, its outlet passage 48 will be uncovered and lubricant supplied to the device 49.

After the valve in the device 49 has operated and pressure built up sufficiently, the check valve 58 will be forced from its seat and permit extrusion of lubricant from the bushing 60, thus indicating to the operator that the system has completely operated and the bearings fully lubricated. It is preferable to direct the bushing 60 so that the extruded lubricant will fall upon a spur gear or some other part of the machinery where the lubricant will not be wasted.

Upon release of the pressure upon the system the springs 46 of all of the devices will gradually force the valves 38 upwardly, at which time the lubricant in the cylinders 36 above the valves will by-pass the valves to the space formed beneath them and the projections 44 will seat in the inlet passages 42 completely to seal the devices and place them in condition for the next lubricating operation. In the drawing the clearance between the valves 38 and their cylinders 36 is greatly exaggerated. This clearance will vary according to the size of the device and the viscosity of the lubricant used.

While I have shown the devices to be of certain relative capacities it is to be understood that devices of any desired capacity may be substituted in the system illustrated so as to supply any desired quantity of lubricant to the various bearings. The flexible conduits may be used in any desired portion of the system, it being desirable, of course, to limit the number of flexible conduits to the minimum. This is one of the advantages of my system inasmuch as it requires only one flexible conduit for supplying lubricant to a plurality of bearings having movement relative to the source of lubricant. With the above described system, the conduit arrangement is just as simple or possibly more simple than in the present systems where the measuring devices are connected in parallel or multiple and, especially when the system is applied to complicated machinery, is more simple than the true series system. The series-parallel system of my invention has advantages of each of the other systems and in addition has material advantages in its adaptability and applicability to various kinds of machines to be lubricated.

If any one of the devices fails to operate properly, or one of the bearings happens to be clogged, the operator is instantly appraised of the failure by the fact that the lubricant is not extruded from the bushing 60. He may thus immediately increase the pressure of the lubricant supply or take other steps to relieve the congested bearing.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. In a system of the class described, a plurality of groups of bearings to be lubricated, a source of lubricant under pressure, means for successively apportioning the lubricant supplied from said source among said groups, and means for successively apportioning the lubricant supplied to said groups among said bearings, both of said means operating at all times at greater than atmospheric pressure.

2. In a system of the class described, the combination of a plurality of elements adapted to receive measured quantities of a fluid, a plurality of measuring devices each for supplying a measured quantity of fluid to a group of said elements, and means, connected in series, for apportioning the fluid supplied by each of said devices among the elements of its group.

3. In a lubricating system of the class described, the combination of a means adapted to receive lubricant under pressure, a plurality of large capacity measuring devices connected in series with said means, a plurality of groups of bearings, each group being connected so as to be supplied with lubricant by one of said devices, and individual measuring means adjacent a majority of the bearings of a group to proportion the lubricant supplied to the group among the bearings of that group.

4. A system for lubricating a plurality of bearings comprising a plurality of primary lubricant measuring devices connected by conduits and adapted to be operated in series, and a series of secondary measuring valves associated with bearings to be lubricated and connected in series with the discharge of one of said primary measuring devices.

5. In a system of the class described, the combination of a plurality of measuring devices having a relatively large capacity connected in series and adapted to be operated sequentially, and a plurality of groups of smaller measuring devices connected with bearings to be lubricated, each group associated with one of said larger measuring devices and supplied with lubricant thereby, each of said groups comprising a series of sequentially operable measuring devices adapted to deliver measured charges of lubricant to their associated bearings.

6. In a system of the class described, the combination of a plurality of bearings having relative movement, a plurality of primary measuring devices adapted to be operated sequentially upon being supplied with lubricant under pressure, a plurality of secondary measuring devices adapted to receive the measured charge from one of said primary devices and to supply predetermined portions thereof to bearings to be lubricated and a flexible conduit connecting the discharge of one of said secondary devices with a relatively movable bearing.

7. In a system of the class described, the combination of a plurality of groups of bearings, a source of lubricant under pressure, and means for sequentially supplying said groups with measured charges of lubricant and sequentially distributing said measured charges to the bearings of a group.

8. In a system of the class described, the combination of a source of lubricant under pressure, measuring means operative upon a pressure impulse of said lubricant to force a measured charge of lubricant to a group of bearings and thereafter connect said source with a second measuring means, and means associated with said group of bearings to force predetermined portions of said measured charge to the bearings of said group.

9. In a lubricating system of the class described, the combination of a means adapted to be quickly connected to a source of lubricant under pressure, a plurality of large capacity measuring devices connected to said means, a plurality of groups of bearings, each group being adapted to be supplied with lubricant by one of said devices, and individual measuring devices associated with each except one of the bearings of a group and adapted to proportion the lubricant supplied to the group among the bearings of that group.

10. In a system of lubrication, the combination of a plurality of groups of bearings, means for segregating and supplying in a measured charge to each group, and means for sequentially apportioning said measured charges among the bearings of its group, said last-named means operating at all times at pressures greater than atmospheric.

11. In a system of the class described, the combination of a plurality of groups of bearings sequentially operable, means for automatically supplying a predetermined quantity of lubricant to each group and simultaneously forcing an equal charge of lubricant to the bearings of the group, and means for apportioning said last-named charge among the bearings of the group, said last-named means operating at a pressure above atmospheric at all times.

12. In a system of the class described, the combination of a plurality of groups of bearings, means operable upon a lubricant pressure impulse sequentially to segregate a measured charge for each group of bearings and thereupon forcing an equal charge to the bearings of the group, and means for apportioning said measured charge among the bearings of the group, said last-named means operating at greater than atmospheric pressure at all times.

13. In a system of the class described, the combination of a plurality of groups of bearings, means for sequentially supplying a predetermined quantity of lubricant to each group, and means for simultaneously distributing an equal charge to the bearings of each of the groups in accordance with the predetermined requirements of each individual bearing.

In witness whereof, I hereunto subscribe my name this 5th day of November, 1927.

CHAS. A. FINE.